United States Patent [19]

Onisawa et al.

[11] Patent Number: 5,363,829
[45] Date of Patent: Nov. 15, 1994

[54] IGNITION DISTRIBUTOR OF INTERNAL COMBUSTION ENGINE

[75] Inventors: Makoto Onisawa, Hitachi; Ken Yoshioka, Hitachiohta; Makoto Koizumi, Ibaraki; Hiromitsu Nagae; Ryoichi Koshida, both of Katsuta, all of Japan

[73] Assignee: Hitachi, Ltd., Tokyo, Japan

[21] Appl. No.: 94,295

[22] Filed: Jul. 21, 1993

[30] Foreign Application Priority Data

Jul. 23, 1992 [JP] Japan .................. 4-197143

[51] Int. Cl.⁵ .............................................. F02F 9/00
[52] U.S. Cl. .............................................. 123/617
[58] Field of Search ................ 123/617, 418, 643; 324/207, 207.2

[56] References Cited

U.S. PATENT DOCUMENTS

| | | | |
|---|---|---|---|
| 4,742,811 | 5/1988 | Okada et al. | 123/643 |
| 4,747,382 | 5/1988 | Suzuki et al. | 123/617 |
| 4,810,967 | 3/1989 | Yokoyama et al. | 324/207 |
| 4,966,116 | 10/1990 | Hidetoshi et al. | 123/418 |
| 4,987,879 | 1/1991 | Chi et al. | 123/617 |
| 5,097,209 | 3/1992 | Santos | 324/207.2 |

*Primary Examiner*—Raymond A. Nelli
*Attorney, Agent, or Firm*—Antonelli, Terry, Stout & Kraus

[57] ABSTRACT

A small, light and low cost ignition distributor having improved rotary detection accuracy can be realized. A pole piece having a pickup coil wound on it and bypass pole pieces having no pickup coil are arranged on the ignition distributor. The distance between the pole piece having a pickup coil and the bypass pole pieces is about 1.5 times as long as the distance between protrusions formed on the peripheral portion of a rotary body. When the distance between the pole piece having a pickup coil and a reluctor is minimum, the distance between the bypass pole pieces and the reluctor is maximum, and the linkage of magnetic flux of the pickup coil is maximum. When the distance between the pole piece having a pickup coil and the reluctor is maximum, the distance between the bypass pole pieces and the reluctor is minimum, and the magnetic flux bypasses the pole piece having a pickup coil and passes through the bypass pole pieces. Accordingly, the change of the magnetic flux passing through the pickup coil can be made to be large, and the change of the generated voltage can be made to be larger so that the rotary detection accuracy is improved.

20 Claims, 10 Drawing Sheets

18 : CHENGE OF MAGNETIC FLUX IN THE EMBODIMENT WHEN THE SHAFT ROTATES
19 : CHANGE OF MAGNETIC FLUX IN CONVENTIONAL DISTRIBUTOR

IGNITION DISTRIBUTOR OF INTERNAL COMBUSTION ENGINE

BACKGROUND OF THE INVENTION

The present invention relates to an ignition distributor for detecting the rotary position or the like of an internal combustion engine to generate ignition timing control signals.

There is an ignition device for controlling the ignition timing of an internal combustion engine in an automobile or the like.

FIG. 13 is a schematic explanatory diagram of an ordinary ignition device used in an automobile. In FIG. 13, a reluctor 101 is mounted to a shaft 102 rotating in proportion to the rotation of an internal combustion engine. The reluctor 101 rotates with the rotation of the shaft 102. The reluctor 101 includes protrudes the number of which is more than or equal to the number of the cylinders of the internal combustion engine, being disposed in the vicinity of a stator 104 combined to a permanent magnet 103. A closed magnetic circuit is formed by the reluctor 101, the stator 104, the permanent magnet 103 and a pole piece 113. The size of the gap between the reluctor 101 and the stator 104 is changed with the rotation of the reluctor 101. The magnetic resistance of the magnetic circuit is changed with the size of the gap between the reluctor 101 and the stator, the magnetic flux density in the magnetic circuit being changed by the change of the magnetic resistance of the magnetic circuit.

FIG. 14 is an explanatory diagram of the above-mentioned magnetic circuit, FIG. 15 showing an equivalent circuit of the magnetic circuit. The configuration of FIG. 13 is different from that of FIG. 14 because FIG. 13 shows an abstract example of the ignition device, and FIG. 14 shows a concrete example of the magnetic circuit. In FIGS. 14 and 15, reference numeral R1 represents a magnetic resistor between the top end portion of the pole piece 113 and reluctor 101, reference numeral R2 representing a magnetic resistor from the side surface of the pole piece 113 through a gap to the side surface of the reluctor 101, reference numeral R3 representing a magnetic resistor between the shaft 102 and one end portion of the stator 104. Reference numeral R4 represents a magnetic resistor from the permanent magnet 103 to the side surface of the stator 104, reference numeral R5 representing a magnetic resistor from the permanent magnet 103 to the other end portion of the stator 104. The resistance value of the magnetic resistor R1 is changed with the rotation of the reluctor 101, the linkage of the magnetic flux of a pickup coil 105 being changed with the change of the resistance value of the resistor R1.

An ignition control signal 106 having wave form as shown in FIG. 16 is generated by means of the change in the linkage of the magnetic flux. The ignition control signal 106 is supplied to an ignition signal amplifier 107 as shown in FIG. 13 from the pickup coil 105. The ignition signal amplifier 107 controls ignition signals supplied to an ignition coil 109 on the basis of an ignition threshold voltage 108 as shown in FIG. 16. In a concrete example, as shown in FIG. 16, when the ignition control signal 106 is larger than the ignition threshold voltage 108, an ignition signal 110 supplied to the primary side of the ignition coil 109 is made to be large level. When the ignition control signal 106 is smaller than the ignition threshold voltage 108, the ignition signal 110 is made to be small level. When the ignition signal 110 is made to be small, the magnet flux in the magnetic core of the ignition coil 109 is greatly changed, so that high voltage is induced in the secondary side of the coil 109. The high voltage induced in the secondary side of the coil 109 is distributed from an ignition plug 112a to an ignition plug 112d of each cylinder of the internal combustion engine through a distribution part 111, so that the ignition is carried out. The rotary shaft 102 of the reluctor 101 is interlocked to the rotary shaft of the distribution part 111, as designated by a dotted line in FIG. 13.

SUMMARY OF THE INVENTION

Meanwhile, in the above-described conventional ignition distributor, the rotary angle of the shaft 102 must be detected finely in order to control the engine precisely and finely. In this case, the number of the protrusions must be increased, so that the distance between the protrusions of the reluctor 101 is made to be small. Therefore, the change of the magnetic flux in the pole piece 113 is reduced, so that the change of the output voltage of the pickup coil 105 is also reduced. When the change of the output voltage of the pickup coil 105 is reduced, it is difficult to detect the rotary angle with high accuracy. Therefore, the diameter of the reluctor 101 and the distance between the protrusions of the reluctor 101 are enlarged in order to increase the change of the output voltage. However, if the diameter of the reluctor 101 is enlarged, the size and weight of the ignition distributor are increased. Therefore, it is not preferable.

If the gap between the top end of the pole piece 113 and the protrusion of the reluctor 101 is made to be small, the change of the output voltage can be enlarged. In the above-mentioned distributor, however, when the gap is made to be small, high working accuracy must be required, so that the production costs are increased. Therefore, it is not preferable.

Further, in the above-mentioned distributor, if the winding number of the pickup coil is increased, large output voltage can be obtained even when the change of the magnetic flux is small. However, if the winding number of the pickup coil is increased, the electro-magnetic noise or the like from the ignition coil disposed in the vicinity of the pickup coil are detected by the pickup coil. Therefore, the S/N ratio of the output voltage of the pickup coil is decreased, so that it is not preferable.

To solve the above problem, it is assumed that the ignition distributor of an internal combustion engine disclosed in J.P.A. 63-75357 is applied to the above-mentioned distributor. in J.P.A. 63-75357, the second permanent magnet is disposed in the vicinity of the air gap between a rotary body and a stator in order to enlarge the change of the generated voltage induced by the change of the gap. Namely, when the gap is small, the direction of the magnetic flux generated of the first permanent magnet is equal to that of the second permanent magnet. When the gap is large, the direction of the magnetic flux of the first permanent magnet is opposite to that of the second permanent magnet. Therefore, the change of the voltage generated in the pickup coil is made to be large.

In J.P.A. 63-75357, however, if the number of the protrusions of the reluctor is increased, the leakage magnetic flux of the second permanent magnet is increased because the distance between the protrusions is decreased. Therefore, the magnetic flux required for decreasing the magnetic flux generated by the first permanent magnet becomes small, so that the change of the voltage generated in the pickup coil becomes small. Accordingly, even if the number of the protrusions of the reluctor is increased, the accuracy of detection cannot be improved. Further, the leakage magnetic flux of the second permanent magnet may infect a magnetic circuit for detecting the ignition timing. The magnetic circuit is disposed in the vicinity of the second permanent magnet.

Furthermore, a rotation detecting means for wheel or the like is disclosed in J.P.A. 1-136071. According to the rotation detecting means, the magnetic fluxes opposite with each other are generated to a magnetic sensitive element by the first and second permanent magnets. The rotation detecting means detects the rotation of a rotor having a large number of teeth on the circumferential portion. In the rotation detecting means, magnetic flux flows into the magnetic sensitive element in the first direction when the detecting portion is opposite to one tooth, magnetic flux flows into the element in the second direction opposite to the first direction when the detecting portion is opposite to other tooth. Accordingly, the rotation detection accuracy is improved.

However, in the above-mentioned rotation detecting means, the distance between the first magnet and the second magnet must be shorter than or equal to the distance between teeth of the rotor. Therefore, if the distance between the teeth of the rotor is made to be small, the distance between the first magnet and the second magnet must be made to be small. In this case, high accuracy of dimension must be required, so that the rotation detecting means cannot be manufactured. Further, the influence of the leakage magnetic flux is increased, so that the accuracy of detection is lowered.

J.P.A. 2-64464 discloses a vehicle speed detecting device which is similar to the above-mentioned ignition distributor. A permanent magnet is not used in the above vehicle speed detecting device. According to the speed detecting device, the primary coil is wound on the magnetic core, the magnetic flux generated by the primary coil being detected by the secondary coils arranged on both sides of the primary coil. The linkage of magnetic flux from the primary coil to the secondary coil is changed with the movement of the rotary toothed wheel. In this speed detecting device, if the distance between the teeth of the rotary toothed wheel is made to be small, the distance between the primary coil and the secondary coil must be made to be small. Therefore, high accuracy of dimension must be required, so that the speed detecting device cannot be manufactured. Further, the influence of the leakage magnetic flux is increased, so that the accuracy of detection is lowered.

It is an object of the present invention to realize an ignition distributor in which the cost is low, the weight being light, the size being small, the rotation detection accuracy being improved.

In order to attain the above object, the present invention is constructed as follows:

According to the first aspect of the present invention, an ignition distributor of internal combustion engine includes a rotary body, which rotates in proportion to the number of the rotations of the internal combustion engine, having a plurality of protrusions on its peripheral portion; a magnetic flux passing member, through which the magnetic flux from a magnetic flux generating means passes, arranged opposite to the rotary body; and magnetic flux change detecting means for detecting the change of the magnetic flux passing through the magnetic flux passing member. The magnetic flux passing member includes a plurality of protruded portions on the portion opposite to the rotary body. The plural protruded portions include a detection protruded portion having the magnetic flux change detecting means and bypass protruded portion having no magnetic flux change detecting means. The distance between the detection protruded portion and the bypass protruded portion in the circumferential of the rotary body is (n+m) times as long as the distance between the protrusions of the rotary body. The n is a natural number including 1, and the m is a number which is larger than 0 and smaller than 1.

Preferably, the detection protruded portion and the bypass protruded portion are alternately arranged in the circumferential direction of the rotary body.

Further preferably, the detection protruded portion and the bypass protruded portion are separately arranged in the axis direction of the rotary body.

Further preferably, the distance between detection protruded portion and the bypass protruded portion is (n+0.5) times as long as the distance between the protrusions of the rotary body.

Further preferably, the magnetic flux change detecting means is composed of the pickup coil wound on the detection protruded portion.

Further, according to the second aspect of the present invention, an ignition distributor of internal combustion engine includes rotary bodies, which rotate in proportion to the number of the rotations of the internal combustion engine, having a plurality of protrusions on these peripheral portions; a magnetic flux passing member, through which the magnetic flux from a magnetic flux generating means passes, arranged opposite to the rotary bodies; and magnetic flux change detecting means for detecting the change of the magnetic flux passing through the magnetic flux passing member. The plural rotary bodies are arranged in the direction of the rotary axis. The plural rotary bodies are one group of the rotary bodies having protrusions spaced with each other at substantially same distance the peripheral direction, and the other group of the rotary bodies having protrusions each of which is arranged between the protrusions of one group of the rotary bodies as seen from the axis direction. The magnetic flux passing member includes a plurality of protruded portions on the portions opposite to the rotary bodies. The plural protruded portions include a detection protruded portion having magnetic flux change detecting means and bypass protruded portion having no magnetic flux detecting means. The detection protruded portion is opposite to the peripheral portion of one group of the rotary bodies. The bypass protruded portion is opposite to the peripheral portion of the other group of the rotary bodies. The detection protruded portion and the bypass protruded portion are arranged on substantially same position as seen from the axis direction of the rotary bodies.

Preferably, the protrusions of the other group of the rotary bodies are positioned at substantially center portion between the protrusions of one group of the rotary bodies as seen from the axis direction.

Further preferably, the magnetic flux change detecting means is composed of the pickup coil wound on the protruded portion.

Further, according to the third aspect of the present invention, an ignition distributor of internal combustion engine includes a rotary body, which rotates in proportion to the number of the rotations of the internal combustion engine, having a plurality of protrusions on its peripheral portion; a magnetic flux passing member, through which the magnetic flux from a magnetic flux generating means passes, arranged opposite to the rotary body; and magnetic flux change detecting means for detecting the change of the magnetic flux passing through the magnetic flux passing member. The magnetic flux passing member includes a plurality of protruded portions on the portion opposite to the rotary body. The plural protruded portions include a detection protruded portion and bypass protruded portion. Magnetic flux change detection means are arranged on all or a part of the detection protruded portions and the bypass protruded portions. The distance between the detection protruded portion and the bypass protruded portion in the circumferential of the rotary body is (n+m) times as long as the distance between the protrusions of the rotary body. The n is a natural number including 0, and the m is a number which is larger than 0 and smaller than 1. The ignition distributor further includes a composing means for composing the magnetic flux change detecting means.

Preferably, the magnetic flux change detecting means includes a plurality of the first pickup coils wound on the detection protruded portions respectively, and a plurality of the second pickup coils wound on the bypass protruded portions respectively. The winding direction of the first pickup coils is equal to that of the second pickup coils. The composing means includes the first adder for adding the voltages generated from the plural first pickup coils, the second adder for adding the voltages generated from the plural second pickup coils, and a differential amplifier for performing subtraction between the output voltages of the first and second adders and for amplifying the subtracted voltage.

Further, preferably, the magnetic flux change detecting means includes a plurality of the first pickup coils wound on the detection protruded portions respectively, and a plurality of the second pickup coils wound on the bypass protruded portions respectively. The winding direction of the first pickup coils is the reverse winding direction of the second pickup coils. The composing means includes the first adder for adding the voltages generated from the plural first pickup coils, the second adder for adding the voltages generated from the plural second pickup coils, and a differential amplifier for adding the output voltage of the first adder to the output voltage of the second adder and for amplifying the added voltage.

Further, according to the fourth aspect of the present invention, an ignition distributor of internal combustion engine includes rotary bodies, which rotate in proportion to the number of the rotations of the internal combustion engine, having a plurality of protrusions on these peripheral portions; a magnetic flux passing member through which the magnetic flux from a magnetic generating means passes, arranged opposite to the rotary bodies; and magnetic flux change detecting means for detecting the change of the magnetic flux passing through the magnetic flux passing member. The plural rotary bodies are arranged in the direction of the rotary axis. The plural rotary bodies are one group of the rotary bodies having protrusions spaced with each other at substantially same distance the peripheral direction, and the other group of the rotary bodies having protrusions each of which is arranged between the protrusions of one group of the rotary bodies as seen from the axis direction. The magnetic flux passing member includes a plurality of protruded portions disposed on portions opposite to the rotary bodies. The plural protruded portions include a detection protruded portion and bypass protruded portion. The detection protruded portion is opposite to the peripheral portions of one group of the rotary bodies. The bypass protruded portion is opposite to the peripheral portions of the other group of the rotary bodies. The detection protruded portion and the bypass protruded portion are arranged on substantially same position as seen from the peripheral direction. Magnetic flux change detecting means are arranged on all or a part of the detection protruded portions and the bypass protruded portions. The ignition distributor further includes a composing means for composing the detection signals from the magnetic flux detecting means.

Preferably, the magnetic flux change detecting means includes a plurality of the first pickup coils wound on the detection protruded portion respectively and a plurality of the second pickup coils wound on the bypass protruded portion respectively. The winding direction of the first pickup coils is equal to that of the second pickup coils. The composing means includes the first adder for adding the voltages generated from the plural first pickup coils, the second adder for adding the voltages generated from the plural second pickup coils, and a differential amplifier for performing subtraction between the output voltages of the first and second adders and for amplifying the subtracted voltage.

Further, preferably, the magnetic flux change detecting means includes a plurality of the first pickup coils wound on the detection protruded portions respectively, and a plurality of the second pickup coils wound on the bypass protruded portions respectively. The winding direction of the first pickup coils is the reverse winding direction of the second pickup coils. The composing means includes the first adder for adding the voltages generated from the plural first pickup coils, the second adder for adding the voltages generated from the plural second pickup coils, and an amplifier for adding the output voltage of the first adder to the output voltage of the second adder and for amplifying the added voltage.

Further, preferably, the detection protruded portions and the bypass protruded portions are integrally fixed by a guide member made of a non-magnetic substance.

Further, according to the fifth aspect of the present invention, an ignition distributor of internal combustion engine includes a permanent magnet for generating magnetic flux; a magnetic flux passing member, wherein the magnetic flux passes through and one end of the passing member contacts to the permanent magnet; a rotary body having a plurality of protrusions, which are opposite to the other end of the magnetic flux passing member, disposed on its peripheral portion; a shaft for rotating the rotary body in proportion to the number of the rotations of the internal combustion engine; a stator one end of which is opposite to the shaft and the other end is contacted to the permanent magnet; and a magnetic flux change detecting means. The closed magnetic circuit is formed of the permanent magnet, the flux passing member, the rotary body, the shaft, and the stator. The quantity of the magnetic flux passing through the magnetic flux passing member is changed by the rotation of the rotary body. The magnetic flux passing member includes a plurality of protruded portions on the portion opposite to the rotary body. A plurality of protruded portions are formed on the other end of the magnetic flux passing member. The plural protruded portions include detection protruded portions having flux change detecting means and bypass protruded portions having no magnetic flux change detecting means. The distance between the detection protruded portion and the bypass protruded portion in the circumferential of the rotary body is (n+m) times as long as the distance between the protrusions of the rotary body. The n is a natural number including 0, and the m is a number which is larger than 0 and smaller than 1.

When the distance between the detection protruded portion of the magnetic flux passing member and the peripheral portion of the rotary body is small, the distance between the bypass protruded portion and the peripheral portion of the rotary body is large, and the quantity of the magnetic flux passing through the detection protruded portion is large. When the distance between the detection protruded portion and the peripheral portion of the rotary body is large, the distance between the bypass protruded portion and the peripheral portion of the rotary body is small. Then, the detection protruded portion is bypassed, the magnetic flux passing through the bypass protruded portion, the quantity of the magnetic flux passing through the detection protruded portion being small. Accordingly, the change of the magnetic flux passing through the detection protruded portion can be made to be large in response to the rotation of the rotary body, so that the accuracy of the detection of the rotary position of the rotary body can be improved. In this case, if the distance between protrusions formed on the peripheral portion of the rotary body is reduced to increase the number of the protrusions, the change of the magnetic flux passing through the detection protruded portion can be made to be large in case that the distance between the detection protruded portion and the bypass protruded portion is about (n+m) times as long as the distance between the protrusions. Further, if the distance between protrusions of the rotary body is reduced to increase the number of the protrusions, the change of the magnetic flux passing through the detection protruded portion can be made to be large in case that the protrusion of the other rotary body is arranged between the protrusions of one rotary body as seen from the rotary axis of the rotary bodies. Therefore, if the distance between the protrusions of the rotary body is reduced the change of the magnetic flux can be made to be large, and the ignition distributor having improved rotation detecting accuracy can be realized without reducing the distance between the detection protruded portion and the bypass protruded portion.

Further, the change of the magnetic flux passing through the detection protruded portion is combined with the change of the magnetic flux passing through the bypass protruded portion. Therefore, the change of the quantity of the magnetic flux can be made to be large, and the rotation detecting accuracy can be further improved.

DETAILED DESCRIPTION OF THE PREFERRED EMBODIMENTS

Hereinafter, preferred embodiments of the present invention will be described with reference to the accompanying drawings.

Figure 1:
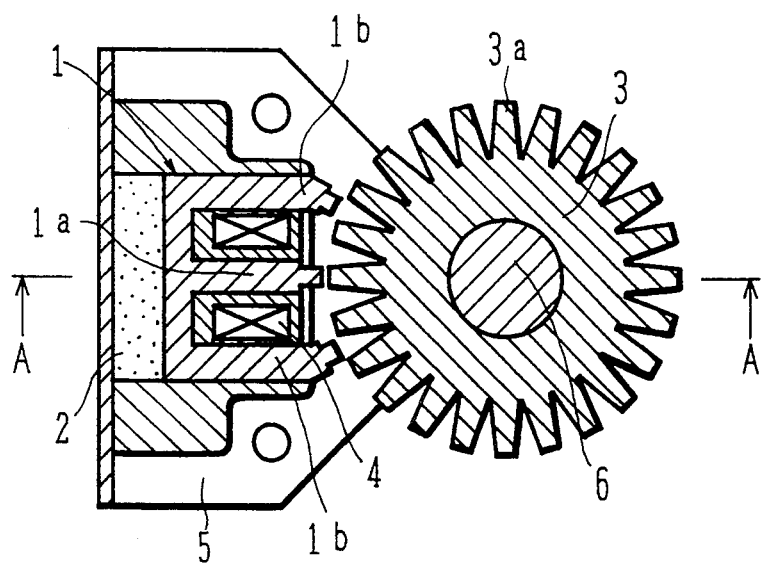
FIG. 1 is a schematic sectional view of the principal portion of the first embodiment of the present inventions.
Figure 2:
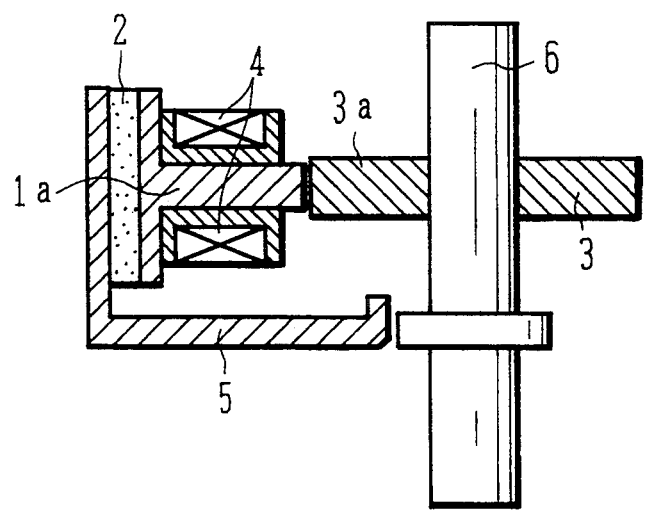
FIG. 2 is a sectional view taken along line A—A in FIG. 1.

FIG. 1 is a schematic sectional view of the first embodiment of the present invention, FIG. 2 being a schematic sectional view taken along line A—A in FIG. 1.

In FIGS. 1 and 2, a pole piece portion (magnetic flux passing member) 1 includes a pole piece (protrusion portion for detection) 1a on which a pickup coil 4 is wound, and two bypass pole pieces (protrusions for bypass) 1b on which no pickup coil is wound. The pole piece 1a is arranged between two pole pieces 1b. Reference numeral 2 represents a permanent magnet, reference numeral 5 representing a stator, reference numeral 3 representing a reluctor (rotary body). A plurality of protrusions 3a are formed on the circumferential portion (peripheral portion) of the reluctor 3. The distance between the pole piece 1a and the pole piece 1b is 1.5 times as long as that of the protrusions 3a adjacent with each other. Therefore, when the top end of the pole piece 1a is opposite to the protrusion 3a, the top end of the pole piece 1b is opposite to the gap between the protrusions 3a and 3a. When the top end of the pole piece 1a is opposite to the gap between the protrusions 3a and 3a, the top end of the pole piece 1b is opposite to the protrusion 3a. Namely, when the distance between the pole piece 1a and reluctor 3 is minimum, the distance between the pole piece 1b and the reluctor 3 is maximum. Further, when the distance between the pole piece 1a and reluctor 3 is maximum, the distance between the pole piece 1b and the reluctor 3 is minimum. These permanent magnet 2, pole piece portion 1, reluctor 3, shaft 6, and stator 5 form a magnetic circuit.

Figure 3:
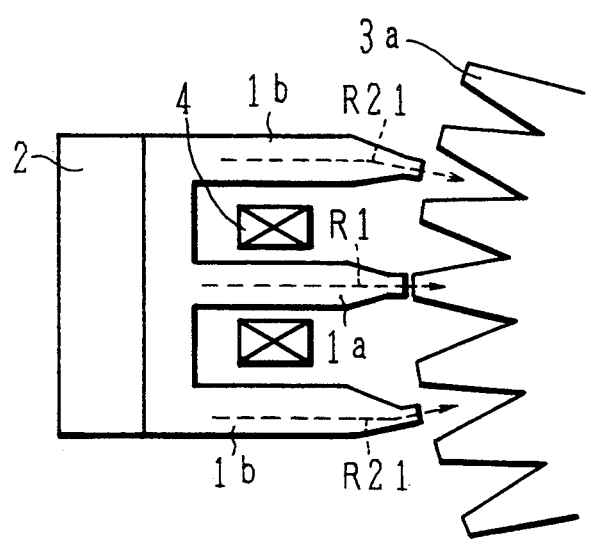
FIG. 3 is an explanatory diagram of the magnetic circuit in the embodiment shown in FIG. 1.
Figure 4:
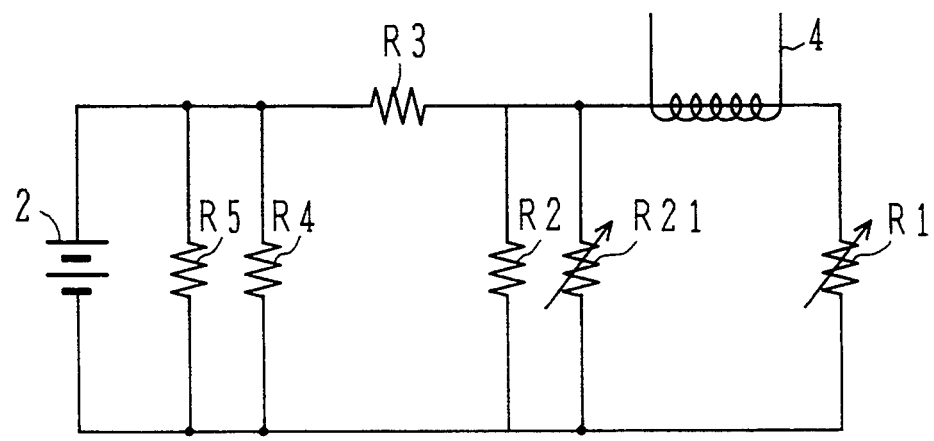
FIG. 4 is an equivalent circuit of the magnetic circuit in the embodiment shown in FIG. 1.
Figure 14:
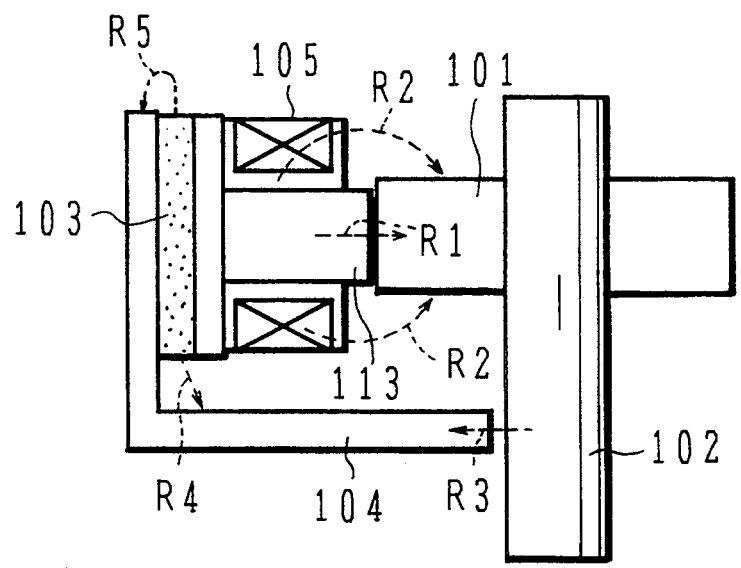
FIG. 14 is an explanatory diagram of the magnetic resistor in the conventional ignition distributor.
Figure 15:
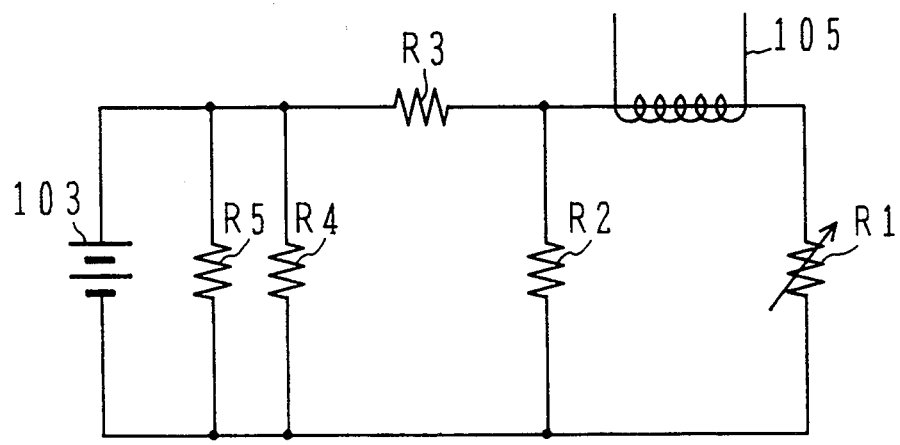
FIG. 15 is an equivalent circuit of the magnetic circuit in the conventional ignition distributor.
Figure 16:
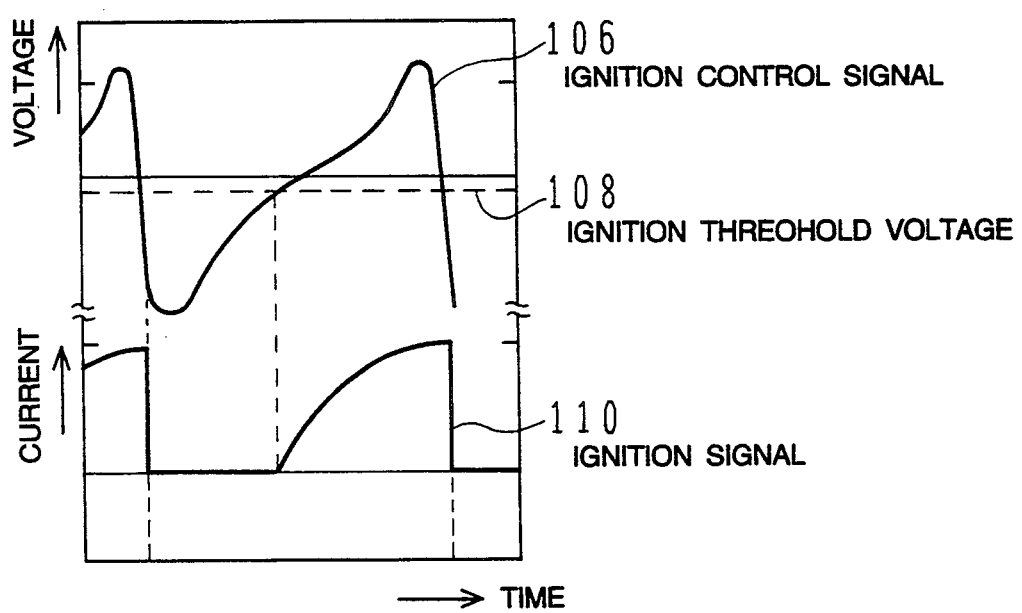
FIG. 16 is a diagram showing waveforms of the ignition control signal and the ignition signal in the conventional ignition distributor.

FIG. 3 is an explanatory view of the above magnetic circuit. In FIG. 3, a magnetic resistor R1 is a magnetic resistor from the pole piece 1a to the reluctor 3, a magnetic resistor R21 being a magnetic resistor from the pole piece 1b to the reluctor 3. Other magnetic resistors are equal to the magnetic resistors as shown FIG. 14. Therefore, the equivalent circuit of the circuit shown in FIG. 3 is shown in FIG. 4. In FIG. 4, the magnetic resistor R21 is connected in parallel with the magnetic resistor R2 in the equivalent circuit in FIG. 15. The resistance value of the resistor R21 is changed in accordance with the change of the distance between the pole piece 1b and reluctor 3. Namely, when the resistance value of the resistor R1 is minimum, the resistance value of the resistor R21 is maximum, and large quantity of the magnetic flux passes through the resistor R21. When the resistance value of the resistor R1 is maximum, the resistance value of the resistor R21 is minimum, and the magnetic flux to be passed through the pole piece 1a is bypassed to the pole piece 1b. Accordingly, the linkage of magnetic flux of the pickup coil 4 is greatly changed.

Figure 5:
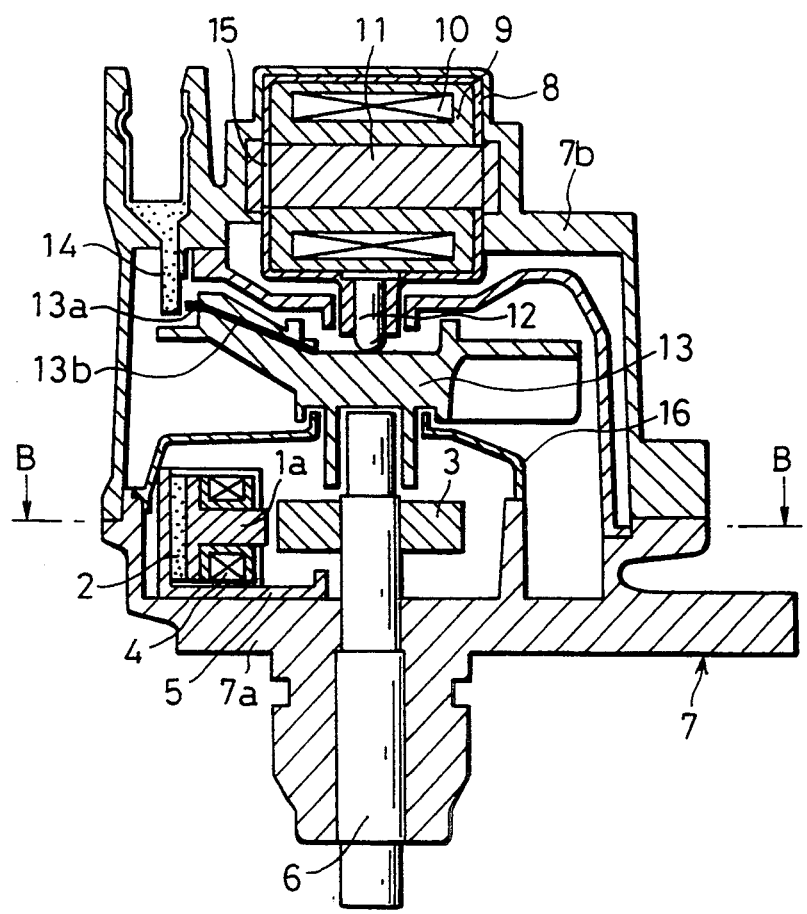
FIG. 5 is a schematic sectional view of the ignition means incorporated with the embodiment shown in FIG. 1.
Figure 6:
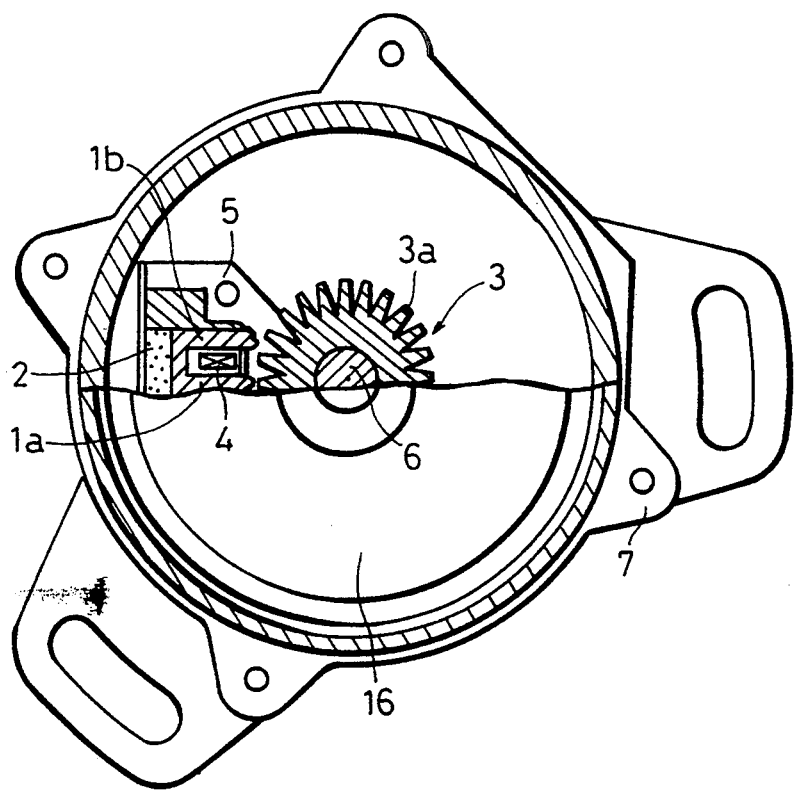
FIG. 6 is a sectional view taken along line B—B in FIG. 5.

FIG. 5 is a schematic sectional view of the ignition means incorporated with the first embodiment of the present invention, FIG. 6 being a sectional view taken along line B—B in FIG. 5.

In FIGS. 5 and 6, the shaft 6 fixing the reluctor 3 is rotatable, being supported by a base portion 7a of a housing 7 of the distributor. The pole piece 1, on which the pickup coil 4 is wound, the permanent magnet 2 and the stator in FIGS. 1 and 2 are disposed on the upper surface of the interior of the base portion 7a. The rotary force of the crank shaft of the internal combustion engine (not shown) is transmitted to the shaft 6, the shaft 6 rotating in proportion to the rotary speed of the internal combustion engine. The reluctor 3 rotates with the rotation of the shaft 6, the ignition control voltage signal being generated.

An ignition coil 8 is arranged on about 3 to 4 cm upper position from the reluctor 3, being fixed to a support inner wall member 7b of the housing 7. The ignition coil 8 includes a primary coil 9, a secondary coil 10, and a coil core 11. The primary and secondary coils 9 and 10 are wound on the coil core 11 in coaxial manner. The coil core 11 is substantially horizontally arranged as shown in FIG. 5. An ignition coil output electrode 12 is protruded from the lower portion of the ignition coil 8 to the side of a rotor head 13, the lower end portion of the electrode 12 being contacted with a rotor head electrode 13b of the rotor head 13. The rotor head 13 is mounted on the top end of the shaft 6, being rotated with the rotation of the internal combustion engine. The rotor head electrode 13b is formed in radius direction from the center portion of the rotor head 13 to a top end portion 13a. The number of side electrodes 14 is equal to that of the cylinders in the internal combustion engine. The side electrodes 14 are arranged on the periphery of the rotor head 13. The top end portion 13a passes through the vicinity of the side electrodes 14 in accordance with the rotation of the rotor head 13. According to the above-mentioned construction, the ignition voltage boosted by the ignition coil 8 is distributed to the ignition plug in each cylinder through the side electrode 14 in accordance with the rotation of the rotor head 13. The center portion of the coil core 11 is arranged horizontally, being formed to be, for example, a cube, a gaps 15 being formed on both sides of the center portion of the core, so that the closed loop of a magnetic circuit is formed. Reference numeral 16 represents a dust cover.

Figure 7:
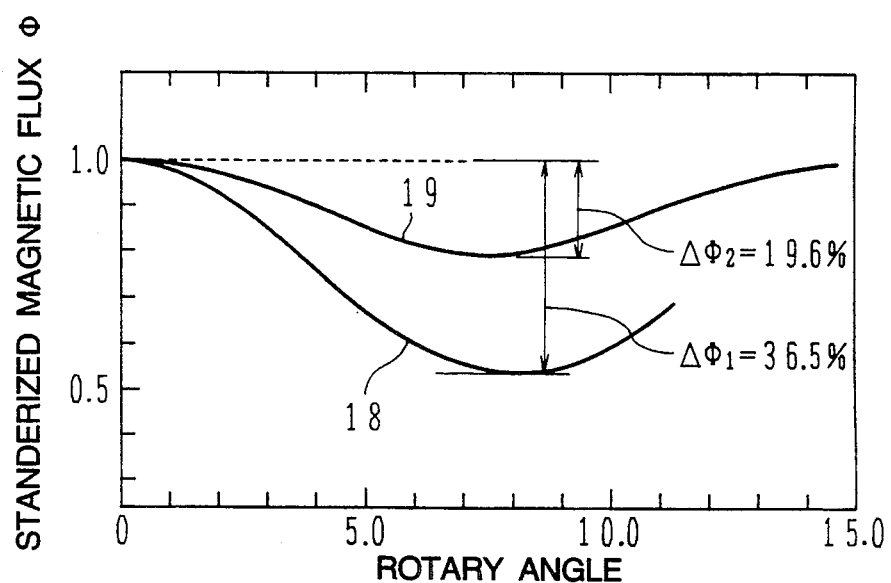
FIG. 7 is a graph for comparing the change of the magnetic flux passing into the embodiment shown in FIG. 1 with the change of the magnetic flux passing into the conventional distributor.

FIG. 7 shows the change of the magnetic flux in the pole piece 1a of the embodiment shown in FIG. 1 when the shaft 6 is rotated. Reference numeral 18 represents the change of the magnetic flux in the embodiment shown in FIG. 1, reference numeral 19 representing the change of the magnetic flux in the conventional distributor having no bypass pole piece. The axis of an ordinary in FIG. 7 represents standardized magnetic flux, the axis of an abscissa representing the rotary angle of the reluctor. In FIG. 7, one pitch of the protrusions is 15 degrees, the rotary angle being 0 degree when the protrusion of the reluctor is justly opposite to the pole piece on which the pickup coil is wound. The maximum magnetic flux change rate $\Delta\Phi 2$ of the change of the magnetic flux 19 is 19.6%. The maximum magnetic flux change rate $\Delta\Phi 1$ of the change of the magnetic flux 18 is 36.5% which is about 1.86 times as large as that of the change of the magnetic flux 19.

As described above, according to the first embodiment of the present invention, the pole piece 1a, on which the pickup coil is wound, is arranged with the bypass pole piece 1b, the distance between the pole pieces 1a and 1b being about 1.5 times as long as the distance between the protrusions 3a and 3a of the reluctor 3. When the distance between the pole piece 1a and the protrusion 3a is minimum, the distance between the pole piece 1b and the protrusion 3a is maximum. When the distance between the pole piece 1a and the protrusion 3a is maximum, the distance between the pole piece 1b and the protrusion 3a is minimum. Therefore, the change of the output voltage of the pickup coil 4 is enlarged, and the rotation detection accuracy of the reluctor 3 can be improved without enlarging the reluctor, without reducing the gap between the pole piece and reluctor, and without increasing the winding number of the pickup coil. Further, if the distance between the pole pieces 1a and 1b is increased to about 2.5 times as long as the distance between the protrusions 3a and 3a in case that the number of the protrusions 3a of the reluctor 3, the distance between the pole piece 1b and protrusion 3a is maximum when the pole piece 1a and the protrusion 3a is minimum. Therefore, the rotation detection accuracy of the reluctor 3 can be improved without reducing the pole piece portion 1, or without difficulty of manufacturing the pole piece portion 1. Furthermore, the number of the winding of the pickup coil 4 can be reduced, if the change of the magnetic flux passing through the pole piece 1a is required to be nearly equal to that of the conventional distributor. Therefore, electro-magnetic noise, which may be detected by the pickup coil, can be reduced, so that the detection accuracy can be improved.

In the embodiment in FIG. 1, the distance between the pole pieces 1a and 1b is about 1.5 times as long as the distance between the protrusions 3a and 3a of the reluctor 3. The present invention is not limited to the above construction. The distance between the pieces 1a and 1b may be about 0.5, 2.5, 3.5 or 4.5 times as long as the distance between the protrusions 3a and 3a. Namely, the distance between the pieces 1a and 1b may be about (n+0.5) times as long as the distance between the protrusions 3a and 3a, wherein the n is a natural number including 0. Further, the number of the bypass pole pieces 1b is not limited to two. The number of the bypass pole pieces 1b may be optional number, such as 1, 3, 4, 5 or the like, if the above-mentioned relationship of the distance between the piece 1a and protrusion 3a, and the distance between the piece 1b and protrusion 3a is satisfied. In this case, the pole piece 1a and 1b may be arranged alternately in the peripheral direction. Further, the pole piece 1a or 1b may be arranged continuously in the peripheral direction.

Figure 8:
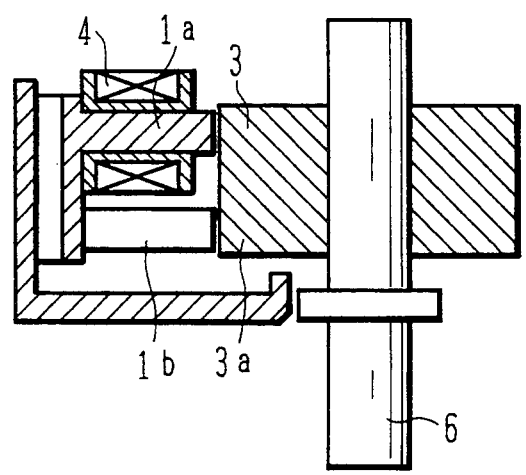
FIG. 8 is a schematic sectional view of the principal portion of the second embodiment of the present invention.

FIG. 8 is a schematic sectional view of the principal portion of the second embodiment of the present invention. In this embodiment, the pole pieces 1a and 1b are arranged separately in the axis direction of the shaft 6. The distance between the pole pieces 1a and 1b in the circumferential direction of the reluctor 3 is equal to that of the embodiment shown in FIG. 1. The number of the pole pieces 1b are two. Further, the length of protrusions 3a in the axis direction of the shaft 6 is longer than that of the embodiment shown in FIG. 1.

According to the above second embodiment of the present invention, the effects as same as the first embodiment can be obtained. Further, according to the second invention, other effects can be obtained as follows;

Namely, although the distance between the pole pieces 1a and 1b in the circumferential direction of the reluctor 3 is equal to that of the embodiment shown in FIG. 1, the distance between the pieces 1a and 1b in the axis direction of the shaft 6 is longer than that of the embodiment in FIG. 1. Therefore, the change of the magnetic flux passing through the pole piece 1a in the second embodiment is larger than that of the embodiment in FIG. 1, so that the detection accuracy of the rotation can be further improved. Furthermore, as the length of the protrusion 3a in the axis direction of the shaft 6 is longer than that of the first embodiment, the magnetic resistance in the path from the reluctor and the shaft 6 to the stator is made to be small. Accordingly, the magnetic flux passing through the above-mentioned path is made to be large, and the magnetic flux passing through the pole piece 1a can be made to be large. Therefore, the number of the windings of the pickup coil 4 can be reduced in comparison with the first embodiment in order to obtain the predetermined ignition timing control voltage. The magnetic noise, which may be detected pickup coil 4, can be reduced, and the rotation detection accuracy can be further improved.

In the second embodiment, the distance between the pole pieces 1a and 1b in the peripheral direction of the reluctor 3 may be about (n+0.5) times as long as the distance between the protrusions 3a and 3a.

Figure 9:
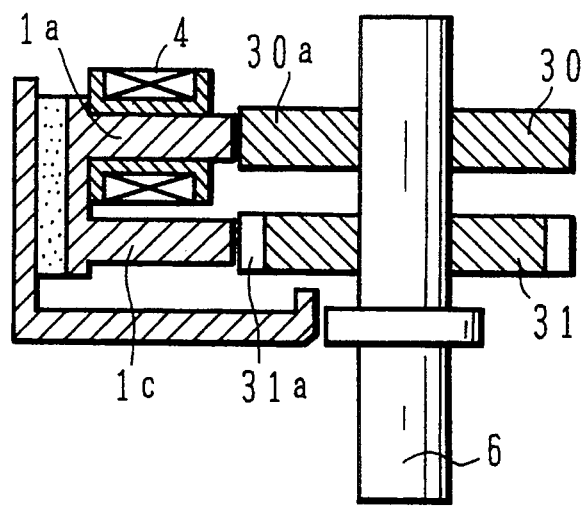
FIG. 9 is a schematic sectional view of the principal portion of the third embodiment of the present invention.

FIG. 9 is a schematic sectional view of the third embodiment of the present invention.

In FIG. 9, reluctors 30 and 31 are continuously arranged in the axis direction of the shaft 6. A protrusion 31a of the reluctor 31 is arranged on substantially center position between the protrusions 30a and 30a of the reluctor 30 as seen from the axis direction of the shaft 6.

Reference numeral 1c represents pole piece on which no pickup coil is wound. The pole pieces 1a and 1c are separately arranged in the axis direction of the shaft 6. The top end portion of the pole piece 1a is opposite to the circumferential edge of the reluctor 30, the top end portion of the pole piece 1c being opposite to the circumferential edge of the reluctor 31. Further, the distance between the pole pieces 1a and 1c in the circumferential direction is nearly equal to zero. Therefore, when the top end portion of the pole piece 1a is justly opposite to the protrusion 30a, the top end portion of the pole piece 1c is opposite to the gap between the protrusions 31a and 31a. When the top end portion of the pole piece 1a is opposite to the gap between the protrusions 30a and 30a, the top end portion of the pole piece 1c is justly opposite to the protrusion 31a. Accordingly, when the distance between the pole piece 1a and reluctor 30 is minimum, the distance between the pole piece 1c and the reluctor 31 is maximum. When the distance between the pole piece 1a and the reluctor 30 is maximum, the distance between the pole piece 1c and the reluctor 31 is minimum.

As described above, according to the third embodiment of the present invention, the effects as same as the first embodiment can be obtained. Further, according to the third embodiment, other effects can be obtained as follows;

Namely, according to the third embodiment of the present invention, as the distance between the pole pieces 1a and 1c can be made to be large, the change of the magnetic flux passing through the pole piece 1a is made to be large in comparison with the first embodiment. Therefore, the rotation detection accuracy can be further improved. Furthermore, the distance between the pole pieces 1a and 1b in the circumferential direction of the reluctors 30 and 31 is nearly equal to zero, so that the distributor can be produced with low cost, and the space required for arranging the distributor can be reduced.

Figure 10:
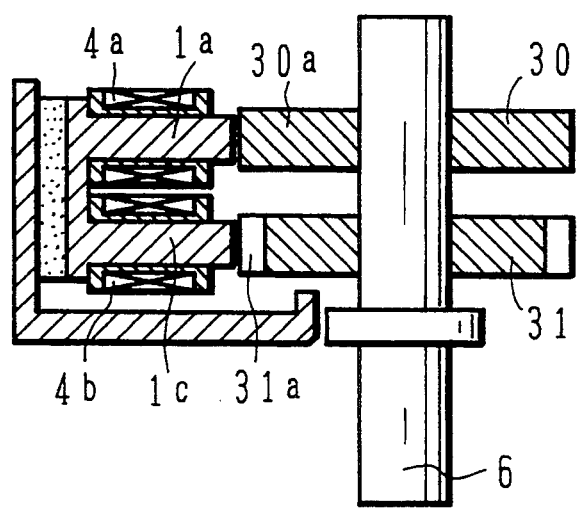
FIG. 10 is a schematic sectional view of the principal portion of the fourth embodiment of the present invention.

FIG. 10 is a schematic sectional view of the fourth embodiment of the present invention. In the fourth embodiment, a pickup coil 4b is wound on the pole piece 1c shown in FIG. 9. In FIG. 10, the winding direction of the pickup coil 1a is reverse winding direction of the pickup coil 1c. Namely, the waveform of the output voltage of the pickup coil 1c is a reverse waveform of the output voltage of the pickup coil 1a, being a half cycle out of phase with the output voltage of the pickup coil. The output voltages of the pickup coils 1a and 1c are composed by an adder(not shown). Therefore, the amplitude of the composed voltage is about 2 times as large as that of the output voltage of the pickup coil 1a.

As described above, according to the fourth embodiment of the present invention, the effects as same as the third embodiment can be obtained. Further, according to the fourth embodiment, as the output voltage of the pickup coil can be made to be 2 times as large as that of the third embodiment, the rotation detection accuracy can be greatly improved.

In the embodiment in FIG. 10, the pickup coils 1a and 1c may be simply connected with each other. Further, in the first and second embodiments, a pickup coil may be wound on the bypass pole piece 1b in reverse direction of the pickup coil 4, and the output voltages from these pickup coils may be composed. Further, the winding directions of the pickup coils 4a and 4b may be made to be equal with each other, and the output voltages from the pickup coils 4a and 4b may be supplied to a differential amplifier(not shown) to obtain the composed output voltage.

Figure 11:
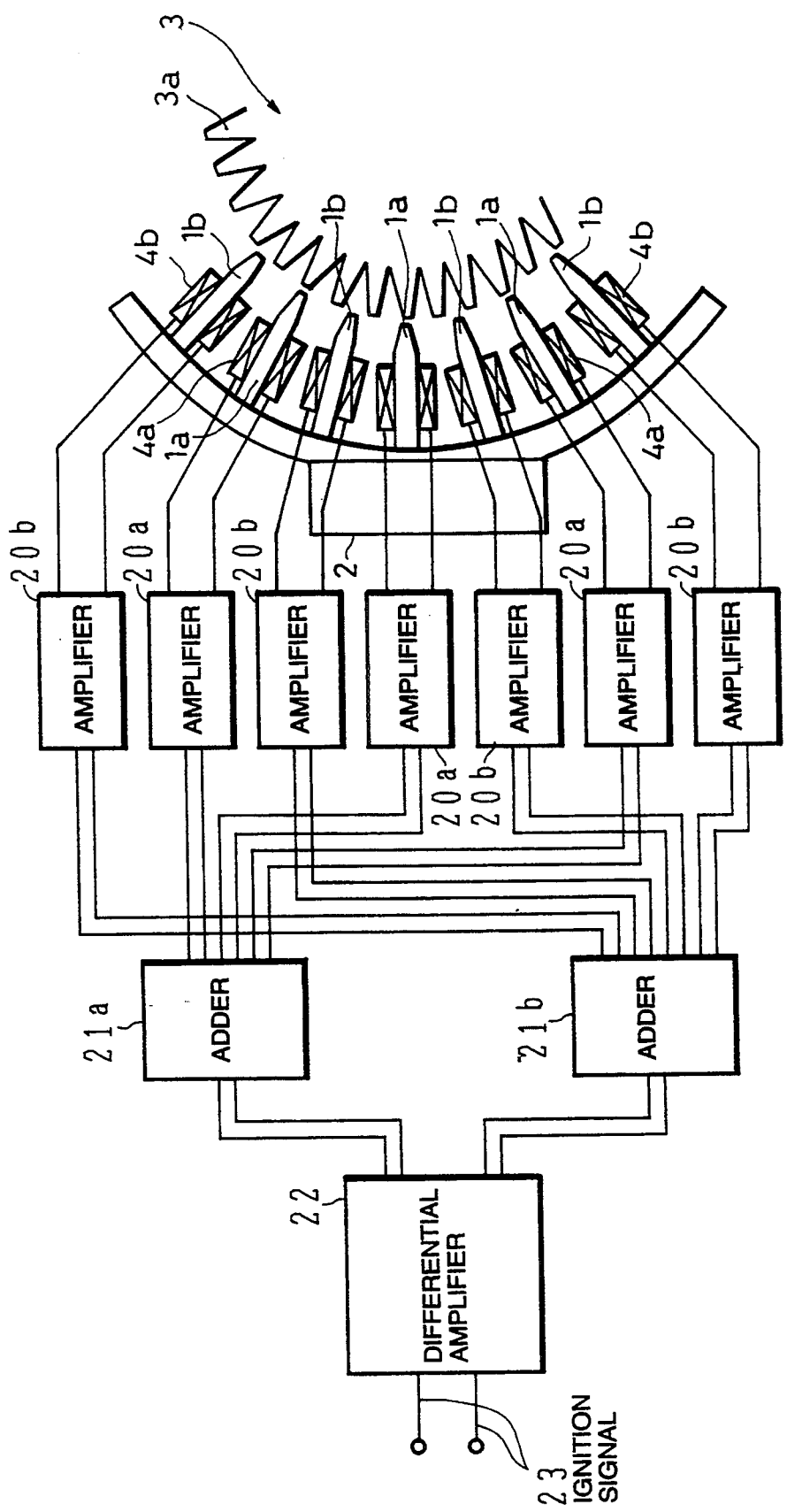
FIG. 11 is a schematic sectional view of the principal portion of the fifth embodiment of the present invention.

FIG. 11 shows a schematic construction of the fifth embodiment of the present invention.

In FIG. 11, three pole pieces 1a and four pole pieces 1b are alternately arranged along the circumferential direction of the periphery of the reluctor 3, the pole piece 1a being evenly spaced with the pole piece 1b. The distance between the pole pieces 1a and 1b is about 1.5 times as long as the distance between the protrusions 3a and 3a of the reluctor 3. The pickup coil 4a is wound on each pole piece 1a, the pickup coil 4b being wound on each pole piece 1b. The winding direction of the coil 4a is equal to that of the coil 4b. The output voltages from the pickup coils 1a are supplied to an adder 21a through amplifiers 20a respectively to add these output voltages. The output voltages from the pickup coils 1b are supplied to an adder 21b through amplifiers 20b respectively to add these output voltages. The output signals from the adders 21a and 21b are supplied to a differential amplifier 22 to execute the operation of the subtraction. The output signal generated from the differential amplifier 22 is used as an ignition signal 23.

According to the fifth embodiment of the present invention, the amplitude of the ignition signal, which is the output signal of the differential amplifier 22, can be made to be large, so that the rotation detection accuracy can be further improved.

In the fifth embodiment, the distance between the pole pieces 1a and 1b in the circumferential direction of the reluctor 3 may be about (n+0.5) times as long as the distance between the protrusions 3a and 3a.

Figure 12:
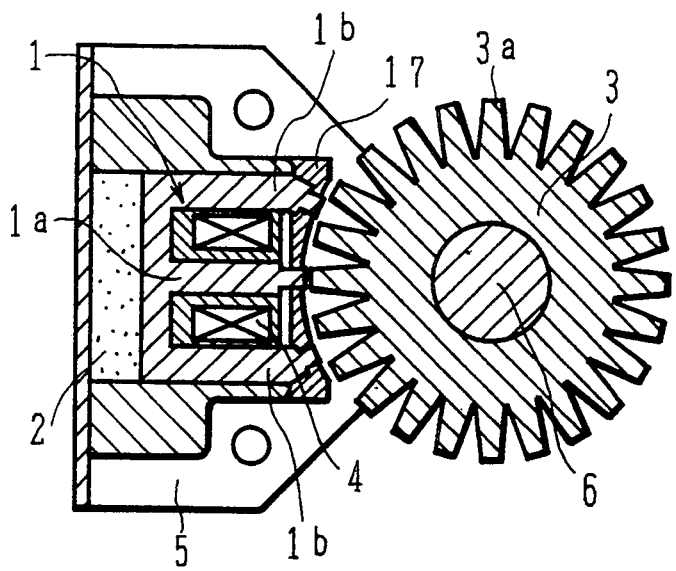
FIG. 12 is a schematic sectional view of the principal portion of the sixth embodiment of the present invention.
Figure 13:
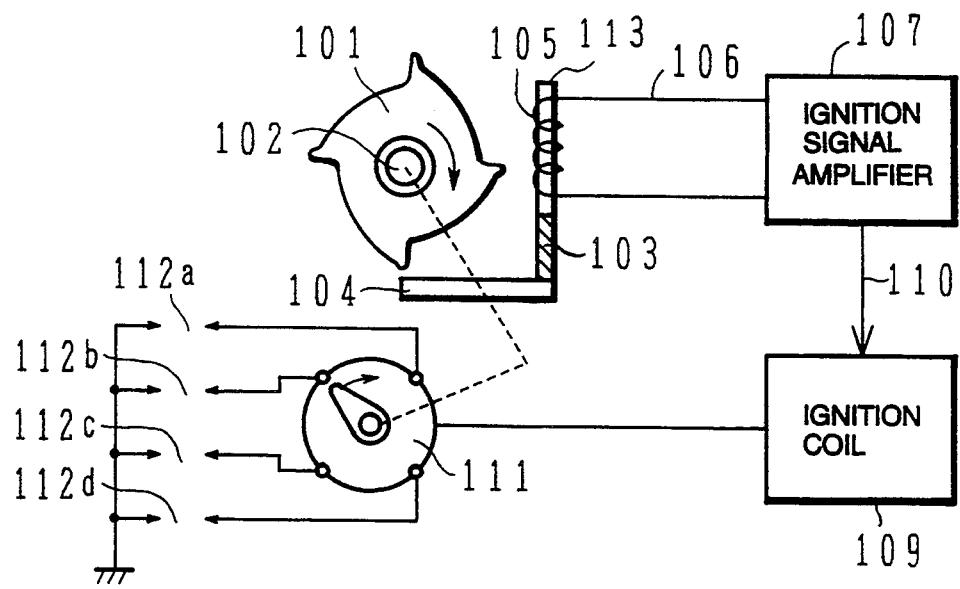
FIG. 13 is a schematic explanatory diagram of the conventional ignition means.

FIG. 12 is a schematic sectional view of the principal portion of the sixth embodiment of the present invention. In this sixth embodiment, a guide 17 made of a non-magnetic substance is arranged in the vicinity of the top end portion of the pole pieces 1a and 1b in the first embodiment shown in FIG. 1. The deformation of the top end portion of the pole pieces can be restricted by the guide 17 in case that vibration or unexpected external force is applied to the distributor at the manufacturing processes. Therefore, the durability and the reliability of operation of the pole piece and pickup coil can be improved.

In the first to fifth embodiments, a guide (similar to the guide 17 of the sixth embodiment) may be arranged on the pole piece portion.

In the first, second, and fifth embodiments, the distance between the pole pieces 1a and 1b in the circumferential direction of the reluctor 3 may be about (n+m) times as long as the distance between the protrusions 3a and 3a. The above m is satisfied to the condition of 0<m<1.

Further, in the third and fourth embodiments, the position of the protrusion 31a of the reluctor is not limited to about center position between the protrusions 30a and 30a of the reluctor 30 as seen from the axis direction of the shaft 6. The protrusion 31a may be positioned to other positions between the protrusions 30a and 30a.

Further, in the first to sixth embodiments, the change of the magnetic flux is detected by using the voltage generated in the pickup coil. The detection of the change of the magnetic flux is not limited to use the voltage generated in the pickup coil. For example, the change of the magnetic flux may be detected by using a magnetic flux change detecting device, such as a Hall device or the like.

As described above, according to the present invention, an ignition distributor of an internal combustion engine includes a rotary body having a plurality of protrusions on its peripheral portion, a magnetic flux passing member, and magnetic flux change detecting means for detecting the change of the magnetic flux passing through the magnetic flux passing member. The magnetic flux passing member includes a plurality of protruded portions on the portion opposite to the rotary body. The plural protruded portions include a detection protruded portion having magnetic flux change detecting means and bypass protruded portion having no magnetic flux change detecting means. The distance between the detection protruded portion and the bypass protruded portion in the circumferential of the rotary body is (n+m) times as long as the distance between the protrusions of the rotary body. The n is a natural number including 0, and the m is a number which is larger than 0 and smaller than 1. When the distance or magnetic resistance between the detection protruded portion and the peripheral portion of the rotary body is small, the distance or magnetic resistance between the bypass protruded portion and the peripheral portion of the rotary body is large. When the distance between the detection protruded portion and the peripheral portion of the rotary body is large, the distance between the bypass protruded portion and the peripheral portion of the rotary body is small.

According to the above construction, the amplitude of the detection signal from the magnetic flux change detecting means can be made to be large. A small, light and low cost ignition distributor having improved rotary detection accuracy can be realized without enlarging the rotary body and without reducing the distance between the protruded portion and the peripheral portion of the rotary body. If the distance between protrusions of the rotary body is reduced to increase the number of the protrusions, the change of the magnetic flux passing through the detection protruded portion can be made to be large in case that the distance between the detection protruded portion and the bypass protruded portion is about (n+m) times as long as the distance between the protrusions. Therefore, if the distance between the protrusions of the rotary body is reduced, the change of the magnetic flux can be made to be large, and the ignition distributor having improved rotation detecting accuracy can be realized without reducing the distance between the detection protruded portion and the bypass protruded portion.

Further, according to the present invention, an ignition distributor of internal combustion engine includes rotary bodies having a plurality of protrusions on these peripheral portions, a magnetic flux passing member, and magnetic flux change detecting means for detecting the change of the magnetic flux passing through the magnetic flux passing member. The plural rotary bodies are arranged in the direction of the rotary axis. The plural rotary bodies are one rotary body having protrusions spaced with each other with substantially same distance the peripheral direction, and the other rotary body having protrusions each of which is arranged between the protrusions of one rotary body as seen from the axis direction. The magnetic flux passing member includes a plurality of protruded portions on the portions opposite to the rotary bodies. The plural protruded portions include a detection protruded portion having magnetic flux change detecting means and by-pass protruded portion having no magnetic flux detecting means. The detection protruded portion is opposite to the peripheral portion of one rotary body. The bypass protruded portion is opposite to the peripheral portion of the other rotary body. The detection protruded portion and the bypass protruded portion are arranged on substantially same position as seen from the axis direction of the rotary bodies. When the distance or magnetic resistance between the detection protruded portion and the peripheral portion of one rotary body is small, the distance or magnetic resistance between the bypass protruded portion and the peripheral portion of the other rotary body is large. When the distance between the detection protruded portion and the peripheral portion of one rotary body is large, the distance between the bypass protruded portion and the peripheral portion of the other rotary body is small.

According to the above construction, the amplitude of the detection signal from the magnetic flux change detecting means can be made to be large. A small, light and low cost ignition distributor having improved rotary detection accuracy can be realized without enlarging the rotary body and without reducing the distance between the protruded portion and the peripheral portion of the rotary body. If the distance between protrusions of the rotary body is reduced to increase the number of the protrusions, the change of the magnetic flux passing through the detection protruded portion can be made to be large in case that the protrusion of the other rotary body is arranged between the protrusions of one rotary body as seen from the rotary axis of the rotary bodies. Therefore, if the distance between the protrusions of the rotary body is reduced, the change of the magnetic flux can be made to be large, and the ignition distributor having improved rotation detecting accuracy can be realized without reducing the distance between the detection protruded portion and the bypass protruded portion.

Further, according to the present invention, an ignition distributor of an internal combustion engine includes a rotary body having a plurality of protrusions on its peripheral portion, a magnetic flux passing member, and magnetic flux change detecting means for detecting the change of the magnetic flux passing through the magnetic flux passing member. The magnetic flux passing member includes a plurality of protruded portions on the portion opposite to the rotary body. The plural protruded portions include a detection protruded portion and bypass protruded portion. Magnetic flux change detection means are arranged on all or a part of the detection protruded portions and the bypass protruded portions. The distance between the detection protruded portion and the bypass protruded portion in the circumferential of the rotary body is (n+m) times as long as the distance between the protrusions of the rotary body. The n is a natural number including 0, and the m is a number which is larger than 0 and smaller than 1. The ignition distributor further includes a composing means for composing the magnetic flux change detecting means. When the distance or magnetic resistance between the detection protruded portion and the peripheral portion of the rotary body is small, the distance or magnetic resistance between the bypass protruded portion and the peripheral portion of the rotary body is large. When the distance between the detection protruded portion and the peripheral portion of the rotary body is large, the distance between the bypass protruded portion and the peripheral portion of the rotary body is small.

According to the above construction, the amplitude of the detection signal from the magnetic flux detecting means can be made to be large. A small, light and low cost ignition distributor having improved rotary detection accuracy can be realized without enlarging the rotary body and without reducing the distance between the protruded portion and the peripheral portion of the rotary body.

Further, according to the present invention, an ignition distributor of internal combustion engine includes rotary bodies having a plurality of protrusions on these peripheral portions, a magnetic flux passing member, and magnetic flux change detecting means for detecting the change of the magnetic flux passing through the magnetic flux passing member. The plural rotary bodies are arranged in the direction of the rotary axis. The plural rotary bodies are one rotary body having protrusions spaced with each other with substantially same distance the peripheral direction, and the other rotary body having protrusions each of which is arranged between the protrusions of one rotary body as seen from the axis direction. The magnetic flux passing member includes a plurality of protruded portions on the portions opposite to the rotary bodies. The plural protruded portions include a detection protruded portion and bypass protruded portion. The detection protruded portion is opposite to the peripheral portion of one rotary body. The bypass protruded portion is opposite to the peripheral portion of the other rotary body. The detection protruded portion and the bypass protruded portion are arranged on substantially same position as seen from the axis direction of the rotary bodies. Magnetic flux change detecting means are arranged on all or a part of the detection protruded portions and the bypass protruded portions. The ignition distributor further includes a composing means for composing the detection signals from the magnetic flux detecting means. When the distance or magnetic resistance between the detection protruded portion and the peripheral portion of one rotary body is small, the distance or magnetic resistance between the bypass protruded portion and the peripheral portion of the other rotary body is large. When the distance between the detection protruded portion and the peripheral portion of one rotary body is large, the distance between the bypass protruded portion and the peripheral portion of the other rotary body is small.

According to the above construction, the amplitude of the detection signal from the magnetic flux change detecting means can be made to be large. A small light and low cost ignition distributor having improved rotary detection accuracy can be realized without enlarging the rotary body and without reducing the distance between the protruded portion and the peripheral portion of the rotary body.

What is claimed is:
1. An ignition distributor of an internal combustion engine comprising:
   magnetic flux generating means;
   a rotary body rotating in proportion to the number of the rotations of the internal combustion engine, said rotary body having a plurality of protrusions on its peripheral portion;
   a magnetic flux passing member arranged opposite to said rotary body, the magnetic flux from said mag- netic flux generating means passing through said magnetic flux passing member; and magnetic flux change detecting means for detecting the change of the magnetic flux passing through said magnetic flux passing member, wherein said magnetic flux passing member includes a plurality of protruded portions disposed on the portion opposite to said rotary body, the plural protruded portions including a detection protruded portion having said magnetic flux change detecting means and bypass protruded portion having no magnetic flux change detecting means, the distance between the detection protruded portion and the bypass protruded portion in the circumferential of said rotary body being (n+m) times as long as the distance between the protrusions of said rotary body, the n being a natural number including 0, the m being a number which is larger than 0 and smaller than 1.

2. An ignition distributor according to claim 1, wherein said detection protruded portion and said bypass protruded portion are alternately arranged in the circumferential direction of said rotary body.

3. An ignition distributor according to claim 1, wherein said detection protruded portion and said bypass protruded portion are separately arranged in the axis direction of said rotary body.

4. An ignition distributor according to any one of claims 1 to 3, wherein the distance between said detection protruded portion and said bypass protruded portion is (n+0.5) times as long as the distance between the protrusions of said rotary body.

5. An ignition distributor according to any one of claim 1, wherein said magnetic flux change detecting means is composed of the pickup coil wound on said detection protruded portion.

6. An ignition distributor of an internal combustion engine comprising:

magnetic flux generating means;

rotary bodies rotating in proportion to the number of the rotations of the internal combustion engine, said rotary bodies having a plurality of protrusions on these peripheral portions;

a magnetic flux passing member arranged opposite to said rotary bodies, the magnetic flux from said magnetic flux generating means passing through said magnetic flux passing member; and magnetic flux change detecting means for detecting the change of the magnetic flux passing through said magnetic flux passing member, wherein said plural rotary bodies are arranged in the direction of the rotary axis, said plural rotary bodies being one group of rotary bodies having protrusions spaced with each other at substantially same distance the peripheral direction and the other group of rotary bodies having protrusions each of which is arranged between the protrusions of one group of the rotary bodies as seen from the axis direction, the magnetic flux passing member including a plurality of protruded portions on the portions opposite to said rotary bodies, the plural protruded portions including a detection protruded portion having magnetic flux change detecting means and bypass protruded portion having no magnetic flux detecting means, said detection protruded portion being opposite to the peripheral portion of one group of the rotary bodies, the bypass protruded portion being opposite to the peripheral portion of the other group of said rotary bodies, the detection protruded portion and the bypass protruded portion being arranged on substantially same position as seen from the axis direction of said rotary bodies.

7. An ignition distributor according to claim 6, wherein the protrusions of the other group of the rotary bodies are positioned at substantially center portion between the protrusions of one group of the rotary bodies as seen from the axis direction.

8. An ignition distributor according to claim 6 or wherein said magnetic flux change detecting means is composed of the pickup coil wound on the protruded portion.

9. An ignition distributor of an internal combustion engine comprising:

magnetic flux generating means;

a rotary body rotating in proportion to the number of the rotations of the internal combustion engine, said rotary body having a plurality of protrusions on its peripheral portion;

a magnetic flux passing member arranged opposite to said rotary body, the magnetic flux from said magnetic flux generating means passing through said magnetic flux passing member;

magnetic flux change detecting means for detecting the change of the magnetic flux passing through said magnetic flux passing member; and composing means for composing the detection signals generated from said magnetic flux change detecting means, wherein said magnetic flux passing member includes a plurality of protruded portions on the portion opposite to said rotary body, the plural protruded portions including a detection protruded portion and bypass protruded portion, said magnetic flux change detection means being arranged on all or a part of the detection protruded portions and the bypass protruded portions, the distance between the detection protruded portion and the bypass protruded portion in the circumferential of said rotary body being (n+m) times as the distance between the protrusions of said rotary body,- the n being a natural number including 0, the m being a number which is larger than 0 and smaller than 1.

10. An ignition distributor according to claim 9, wherein said detection protruded portion and said bypass protruded portion are alternately arranged in the circumferential direction of said rotary body.

11. An ignition distributor according to claim 9, wherein said detection protruded portion and said bypass protruded portion are separately arranged in the axis direction of said rotary body.

12. An ignition distributor according to any one of claims 9 to 11, wherein the distance between said detection protruded portion and said bypass protruded portion is (n+0.5) times as long as the distance between the protrusions of said rotary body.

13. An ignition distributor according to claim 9, wherein said magnetic flux change detecting means includes a plurality of the first pickup coils wound on the detection protruded portions respectively, and a plurality of the second pickup coils wound on the bypass protruded portions respectively, the winding direction of the first pickup coils being equal to that of the second pickup coils, the composing means including the first adder for adding the voltages generated from the plural first pickup coils, the second adder for adding the voltages generated from the plural second pickup coils, and a differential amplifier for performing subtraction between the output voltages of the first and second adders and for amplifying the subtracted voltage.

14. An ignition distributor according to claim 9, wherein said magnetic flux change detecting means includes a plurality of the first pickup coils wound on the detection protruded portions respectively, and a plurality of the second pickup coils wound on the bypass protruded portions respectively, the winding direction of the first pickup coils being the reverse winding direction of the second pickup coils, the composing means including the first adder for adding the voltages generated from the plural first pickup coils, the second adder for adding the voltages generated from the plural second pickup coils, and a differential amplifier for adding the output voltage of the first adder to the output voltage of the second adder and for amplifying the added voltage.

15. An ignition distributor of an internal combustion engine comprising:
magnetic flux generating means;
rotary bodies rotating in proportion to the number of the rotations of the internal combustion engine, said rotary bodies having a plurality of protrusions on these peripheral portions;
a magnetic flux passing member arranged opposite to said rotary bodies, the magnetic flux from said magnetic generating means passing through said magnetic flux passing member;
magnetic flux change detecting means for detecting the change of the magnetic flux passing through said magnetic flux passing member; and
a composing means for composing the detection signals generated from said magnetic flux detecting means,
wherein the plural rotary bodies are arranged in the direction of the rotary axis, said plural rotary bodies being one group of rotary bodies having protrusions spaced with each other at substantially same distance the peripheral direction, and the other group of rotary bodies having protrusions each of which is arranged between the protrusions of one group of rotary bodies as seen from the axis direction, said magnetic flux passing member including a plurality of protruded portions disposed on portions opposite to said rotary bodies, said plural protruded portions including a detection protruded portion and bypass protruded portion, said detection protruded portion being opposite to the peripheral portions of one group of rotary bodies, said bypass protruded portion being opposite to the peripheral portions of the other group of rotary bodies, said detection protruded portion and the bypass protruded portion being arranged on substantially same position as seen from the peripheral direction, said magnetic flux change detecting means being arranged on all or a part of the detection protruded portions and the bypass protruded portions.

16. An ignition distributor according to claim 15, wherein the protrusions of the other group of rotary bodies are positioned at substantially center portion between the protrusions of one group of rotary bodies as seen from the axis direction.

17. An ignition distributor according to claim 15 or 16, wherein said magnetic flux change detecting means includes a plurality of the first pickup coils wound on the detection protruded portion respectively and a plurality of the second pickup coils wound on the bypass protruded portion respectively, the winding direction of the first pickup coils being equal to that of the second pickup coils, said composing means including the first adder for adding the voltages generated from the plural first pickup coils, the second adder for adding the voltages generated from the plural second pickup coils, and a differential amplifier for performing subtraction between the output voltages of the first and second adders and for amplifying the subtracted voltage.

18. An ignition distributor according to claim 15 or 16, wherein said magnetic flux change detecting means includes a plurality of the first pickup coils wound on the detection protruded portions respectively, and a plurality of the second pickup coils wound on the bypass protruded portions respectively, the winding direction of the first pickup coils being the reverse winding direction of the second pickup coils, said composing means including the first adder for adding the voltages generated from the plural first pickup coils, the second adder for adding the voltages generated from the plural second pickup coils, and an amplifier for adding the output voltage of the first adder to the output voltage of the second adder and for amplifying the added voltage.

19. An ignition distributor according to any one of claims 1, 6, 9 and 15, wherein said detection protruded portions and the bypass protruded portions are integrally fixed by a guide member made of a non-magnetic substance.

20. An ignition distributor of an internal combustion engine comprising:
a permanent magnet for generating magnetic flux;
a magnetic flux passing member, wherein the magnetic flux passes through and one end of the passing member contacts to said permanent magnet;
a rotary body having a plurality of protrusions, which are opposite to the other end of the magnetic flux passing member, disposed on its peripheral portion;
a shaft for rotating said rotary body in proportion to the number of the rotations of the internal combustion engine;
a stator one end of which is opposite-to said shaft and the other end is contacted to said permanent magnet; and
a magnetic flux change detecting means,
wherein the closed magnetic circuit is formed of said permanent magnet, said flux passing member, said rotary body, said shaft, and said stator, the quantity of the magnetic flux passing through said magnetic flux passing member being changed by the rotation of said rotary body, the magnetic flux passing member including a plurality of protruded portions on the opposite to said rotary body, a plurality of protruded portions being formed on the other end of said magnetic flux passing member, the plural protruded portions including detection protruded portions having flux change detecting means and bypass protruded portions having no magnetic flux change detecting means, the distance between said detection protruded portion and said bypass protruded portion in the circumferential of said rotary body being $(n+m)$ times as long as the distance between the protrusions of said rotary body, the n being a natural number including 0, the m being a number which is larger than 0 and smaller than 1.

* * * * *